C. I. E. MASTIN.
PISTON ROD PACKING.
APPLICATION FILED JUNE 6, 1913. RENEWED MAR. 14, 1914.
1,150,050.
Patented Aug. 17, 1915.
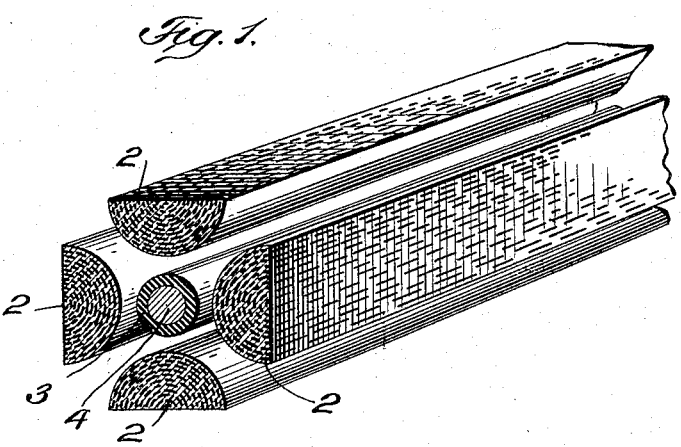
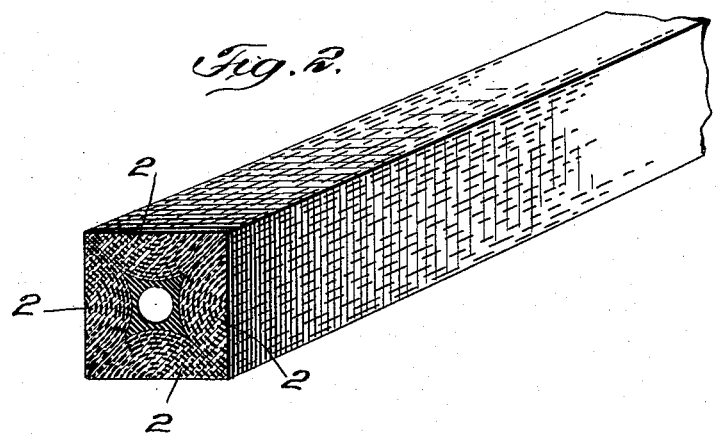
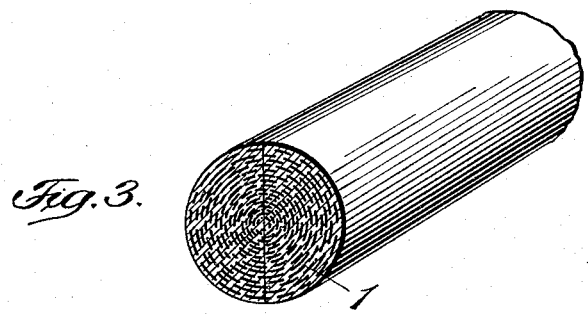

UNITED STATES PATENT OFFICE.

CHARLES I. E. MASTIN, OF MIDLAND PARK, NEW JERSEY.

PISTON-ROD PACKING.

1,150,050. Specification of Letters Patent. Patented Aug. 17, 1915.

Application filed June 6, 1913, Serial No. 772,043. Renewed March 14, 1914. Serial No. 824,790.

*To all whom it may concern:*

Be it known that I, CHARLES I. E. MASTIN, a citizen of the United States, and resident of Midland Park, county of Bergen, and State of New Jersey, have invented certain new and useful Improvements in Piston-Rod Packings, of which the following is a specification.

This invention relates to packing for piston rods and other moving parts of engines and machinery where a tight joint is required to prevent the passage of steam, air, oil or water, or other fluid.

One of the objects of this invention is to provide a packing strip of simple construction which will be very durable and very flexible.

Another object of the invention is to provide a packing strip made up of alternate layers of fabric and rubber so disposed that the edges of the layers of duck and rubber will be exposed on the wearing surfaces of the packing strip.

Another object of the invention is to provide a one-piece packing strip made up of four sections of semi-cylindrical form permanently united with their straight flat surfaces outermost, the space between the convex portions of said elements or sections being filled by a suitable elastic core.

Referring to the drawings, Figure 1 is a sectional perspective view showing the parts of my improved packing strip assembled but unconnected to each other; Fig. 2 a similar view showing the parts united and the packing strip complete; and Fig. 3 a similar view of a roll of fabric and rubber layers before it is divided longitudinally to form semi-cylindrical members of the packing strip.

In making up my improved packing strip I first roll fabric, preferably duck, and rubber layers into a roll 1 of the proper dimensions, as shown in Fig. 3. The diameter of the roll will, of course, govern the size of the completed packing strip. This roll or cylinder is then split longitudinally to form two semi-cylindrical sections 2. Four of these sections are then arranged with their flat straight sides outermost, their convex sides being directed toward each other. This arrangement of the four sections is shown in Fig. 1, said sections being there shown as arranged to form a square packing strip. Between these four sections I arrange a tube 3 of rubber and within said tube I place a mandrel 4. When the parts are thus assembled and brought together they are placed in a suitable press and suitable pressure is brought thereon to compress the same and force the tube 3 to fill the space between the four convex surfaces of the strips. This is shown very clearly in Fig. 2 of the drawing. While the parts are in this compressed condition they are subjected to a suitable heat which unites all of the sections permanently forming a sealed one-piece packing strip. The mandrel is maintained in position in order to form a longitudinal aperture through the packing strip, this aperture giving the strip great flexibility.

It is to be noted that the layers of duck and rubber are curved and that the edges are exposed on the square faces of the packing strip. It is also to be observed that the layers of duck and rubber of each section 2 are exposed on one side of the packing strip and that they do not run through from one side to another. It is also to be observed that there are no angular strips or layers in the packing and that all of said layers maintain their original parallel, curved relation to each other. By bringing all of the edges of the duck and rubber layers to the wearing surfaces of the packing strip these edges are properly presented to the wearing parts, thereby insuring great durability with the least amount of friction on the parts. By arranging the convex sides of the original sections inwardly and filling the space between them with an elastic core the completed packing strip will be very elastic and flexible and may be readily coiled or made into rings, as may be desired.

What I claim is:

1. A packing strip formed of a plurality of semi-cylindrical sections permanently united with their curved or convex surfaces inwardly toward each other.

2. A packing strip comprising a plurality of semi-cylindrical sections permanently united with their convex surfaces inwardly toward each other, each semi-cylindrical section being formed of alternate layers of rubber and fabric.

3. A packing strip comprising a plurality of semi-cylindrical sections permanently united with their convex surfaces inwardly toward each other, each semi-cylindrical section being formed of alternate layers of rubber and fabric, and an elastic core filling the space between said sections and permanently united thereto.

4. A packing strip comprising a plurality of semi-cylindrical sections permanently united with their convex surfaces inwardly toward each other, each semi-cylindrical section being formed of alternate layers of rubber and fabric, and an elastic hollow core filling the space between said sections and permanently united thereto.

5. A packing strip comprising a plurality of semi-cylindrical sections permanently united with their convex surfaces inwardly toward each other, each semi-cylindrical section being formed of alternate layers of fabric and rubber, said layers being parallel with the convex surfaces of the sections, whereby the edges of said layers will be exposed along the outer surfaces of the packing strip.

6. A packing strip comprising a plurality of semi-cylindrical sections permanently united with their convex surfaces inwardly toward each other, each semi-cylindrical section being formed of alternate layers of fabric and rubber, said layers being parallel with the convex surfaces of the sections, whereby the edges of said layers will be exposed along the outer surfaces of the packing strip, and an elastic core filling the space between said sections and permanently united thereto.

7. A packing strip comprising a plurality of semi-cylindrical sections permanently united with their convex surfaces inwardly toward each other, each semi-cylindrical section being formed of alternate layers of fabric and rubber, said layers being parallel with the convex surfaces of the sections, whereby the edges of said layers will be exposed along the outer surfaces of the packing strip, and an elastic hollow core filling the space between said sections and permanently united thereto.

8. A packing strip comprising four semi-cylindrical sections permanently united with their convex surfaces inwardly and their straight flat surfaces forming the outer surfaces of the packing strip, each of said sections being formed of alternate layers of fabric and rubber, said layers being parallel to the convex surfaces of the sections and the edges of said layers being exposed on the flat outer surfaces of the packing strip.

9. A packing strip comprising four semi-cylindrical sections permanently united with their convex surfaces inwardly and their straight flat surfaces forming the outer surfaces of the packing strip, each of said sections being formed of alternate layers of fabric and rubber, said layers being parallel to the convex surfaces of the sections and the edges of said layers being exposed on the flat outer surfaces of the packing strip, the space between said sections being filled with an elastic core permanently united therewith.

10. A packing strip comprising four semi-cylindrical sections permanently united with their convex surfaces inwardly and their straight flat surfaces forming the outer surfaces of the packing strip, each of said sections being formed of alternate layers of fabric and rubber, said layers being parallel to the convex surfaces of the sections and the edges of said layers being exposed on the flat outer surfaces of the packing strip, the space between said sections being filled with an elastic hollow core permanently united therewith.

11. A packing composed of a plurality of sections or strips each of which is formed with a straight side and a curved side said strips being assembled around a cushion core or center and united, the curved sides of the strips being within the packing and the straight sides thereof forming the exterior walls of the packing.

12. A packing composed of a plurality of strips assembled around a core the inner surfaces of said strips being curved and the outer sides thereof being straight flat surfaces and forming the exterior walls of the packing, and a cushion core filling the center space formed by said assembled sections.

13. A packing composed of a plurality of strips assembled around a core the inner surfaces of said strips being curved and the outer sides thereof being straight flat surfaces and forming the exterior walls of the packing, and a hollow cushion core filling the center space formed by said assembled sections.

14. A one-piece packing strip composed of a plurality of sections or strips each of which is formed with a straight side and a curved side, said strips being assembled and permanently united by heat and pressure to form the sections into a homogeneous mass, the curved sides of the strips being within the packing and the straight sides thereof forming the exterior walls of the packing.

15. A one-piece packing composed of a plurality of strips assembled around a core, the inner surfaces of said strips being curved and the outer sides thereof being straight flat surfaces and forming the exterior walls of the packing, the strips being permanently joined together at the corners of the packing strip under heat and pressure to form a homogeneous mass.

In testimony whereof I hereunto affix my signature in the presence of two witnesses.

CHARLES I. E. MASTIN.

Witnesses:
LILLIAN McGUIRE,
F. R. MILLER.